US000001366H

United States Statutory Invention Registration [19]

[11] Reg. Number: H1366

Bickes, Jr. et al.

[43] Published: Nov. 1, 1994

[54] SCB INITIATOR

[75] Inventors: Robert W. Bickes, Jr.; Anita M. Renlund; Philip L. Stanton, all of Albuquerque, N. Mex.

[73] Assignee: The United States of America as represented by the United States Department of Energy, Washington, D.C.

[21] Appl. No.: 321,659

[22] Filed: Feb. 28, 1989

[51] Int. Cl.[5] ..... F42C 19/12

[52] U.S. Cl. ..... 102/202.5; 102/201

*Primary Examiner*—Harold J. Tudor

*Attorney, Agent, or Firm*—George H. Libman; James H. Chafin; Judson R. Hightower

[57] ABSTRACT

A detonator for high explosives initiated by mechanical impact includes a cylindrical barrel, a layer of flyer material mechanically covering the barrel at one end, and a semiconductor bridge ignitor including a pair of electrically conductive pads connected by a semiconductor bridge. The bridge is in operational contact with the layer, whereby ignition of said bridge forces a portion of the layer through the barrel to detonate the explosive. Input means are provided for igniting the semiconductor bridge ignitor.

7 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SCB INITIATOR

The U.S. Government has rights in this invention pursuant to Contract No. DE-AC04-76DP00789 between the Department of Energy and AT&T Technologies, Inc.

BACKGROUND OF THE INVENTION

This invention relates generally to an improved detonator, and more particularly, to a semiconductor bridge (SCB) actuated detonator for high explosives.

The inexpensive and reliable ignition of explosives is a desirable goal for obvious cost and safety reasons. To this end, the semiconductor bridge (SCB) igniter of R. Bickes et al., U.S. Pat. No. 4,708,060, was developed. This invention has a short semiconductor bridge between two spaced metal pads on a nonconducting substrate. The heavily doped, approximately one ohm, bridge is in contact with an explosive material. The bridge is easily designed to not fire when a "no fire" current is applied, but to fire when a higher "fire" current is applied. As disclosed, application of a 15A, 15 us current pulse through the SCB produces a plasma discharge that ignites the explosive material at a relatively slow rate. Such ignition is suitable for actuators, gas generators and rocket motors, but is not fast enough for other applications.

In some applications, high explosive powders are initiated by the mechanical impulse provided by a slapper detonator, a piece of hard material rapidly propelled against the powder by an electrically exploded metal foil. Because a slapper can generate detonation promptly, this technology can be used wherever exploding bridge wire devices are normally used to initiate these high explosives. The use of a slapper initiator permits the use of more stable explosives, an important safety consideration.

In addition, exploding bridge wires have also been used for direct initiation of high explosives, a construction that eliminates the slapper structure.

SUMMARY OF THE INVENTION

It is an object of this invention to use an SCB as the exploding foil in a slapper detonator.

It is another object of this invention to use a high current pulse to cause an SCB to function as a slapper detonator.

It is still another object of this invention to provide a low inductance capacitor to discharge into an SCB to initiate it as a slapper detonator.

It is also an object of this invention to use an SCB for direct and very prompt initiation of a high explosive.

It is a further object of this invention to provide a laser to arm an undoped SCB either for direct initiation or in a slapper detonator.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, a first embodiment of the present invention may comprise a detonator for high explosives initiated by mechanical impact, the detonator comprising a cylindrical barrel or spacer having a tubular opening extending from an output end, mechanically coupled to an explosive, to an input end, a layer of flyer material mechanically covering the tubular opening at the input end, and a semiconductor bridge ignitor including an pair of electrically conductive pads connected by a semiconductor bridge, the bridge being in operational contact with the layer. Ignition of the bridge forces a portion of the layer through the barrel at high velocity to detonate the explosive upon impact. Input means are provided for igniting the semiconductor bridge ignitor. A second embodiment of the present invention is similar to the first embodiment except that the high explosive is in direct contact with the SCB, with no cylindrical barrel or flyer material being used.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
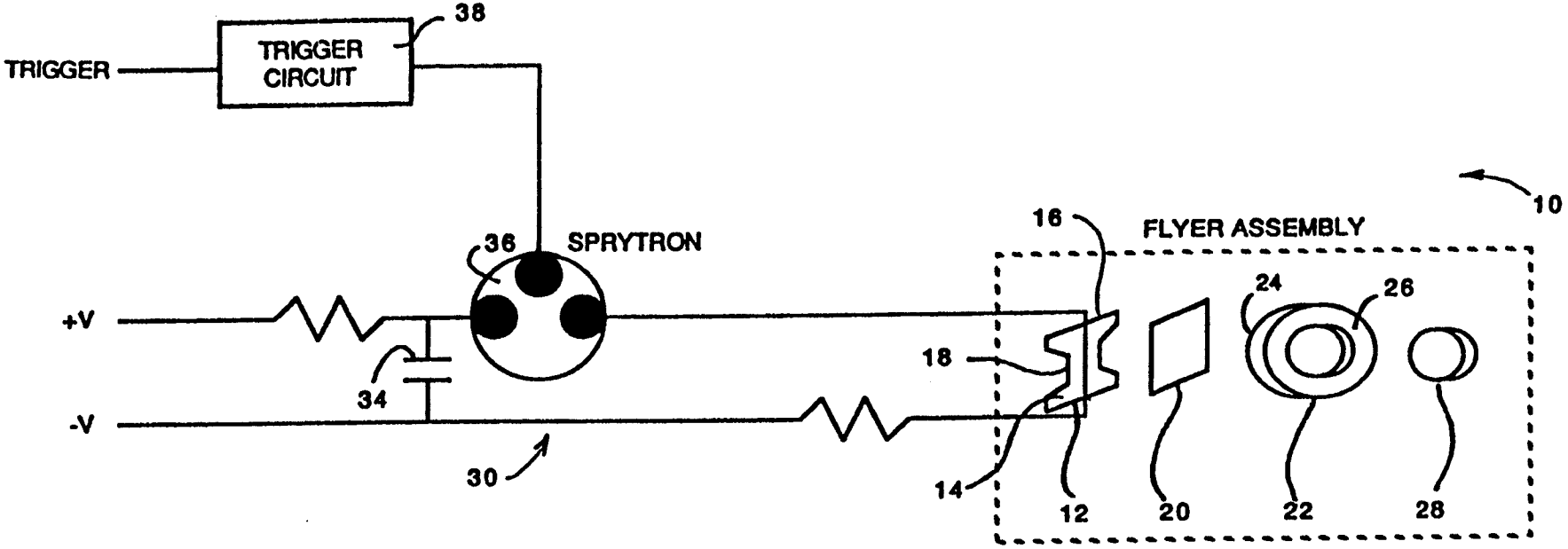
FIG. 1 shows a first embodiment of the invention.

FIG. 1 shows a first embodiment of the invention where a flyer assembly 10 for initiating a high explosive is actuated by an input circuit 30.

Flyer assembly 10 may comprise a substrate 11 (shown in FIG. 2) upon which a SCB 12 is formed as taught by U.S. Pat. No. 4,708,060, the disclosure of this patent being incorporated herein by reference. SCB 12 typically includes a highly doped silicon layer 18 on a substrate 11 and having metallized lands 14 and 16 at opposite ends, forming a bridge therebetween. Lands 14 and 16 may be connected to input circuit 30 by solder connections (not shown), or by other methods such as thermocompressive or ultrasonic bonds.

A nonconductive plastic flyer layer 20, typically 1 to 3 mil thick, is placed over the SCB. A hard nonconductive barrel or spacer 22, typically sapphire, having an inside diameter of about 20 mils and a thickness of about 20 mils, is placed over flyer layer 20 and bridge 18. A high explosive 28 such as PETN or HNS is adjacent the output end 26 of barrel 22.

In operation, when a low inductance input circuit 30 provides a fast rise-time pulse on the order of 1000 amps to flyer assembly 10, bridge 18 vaporizes and explodes with sufficient energy to force flyer layer 20 against the input end 24 of barrel 22. The portion of layer 20 abutting barrel 22 is prevented from movement away from substrate 11 by the inertia of barrel 22. However, a portion of flyer layer 20 is sheared by the inside edge and passes through the central portion of barrel 20. This "flying" portion hits explosive 28 with sufficient energy to detonate the explosive. This operation differs from the teaching of U.S. Pat. No. 4,708,060 in that an SCB could safely be ignited with a relatively low power source.

Figure 2:
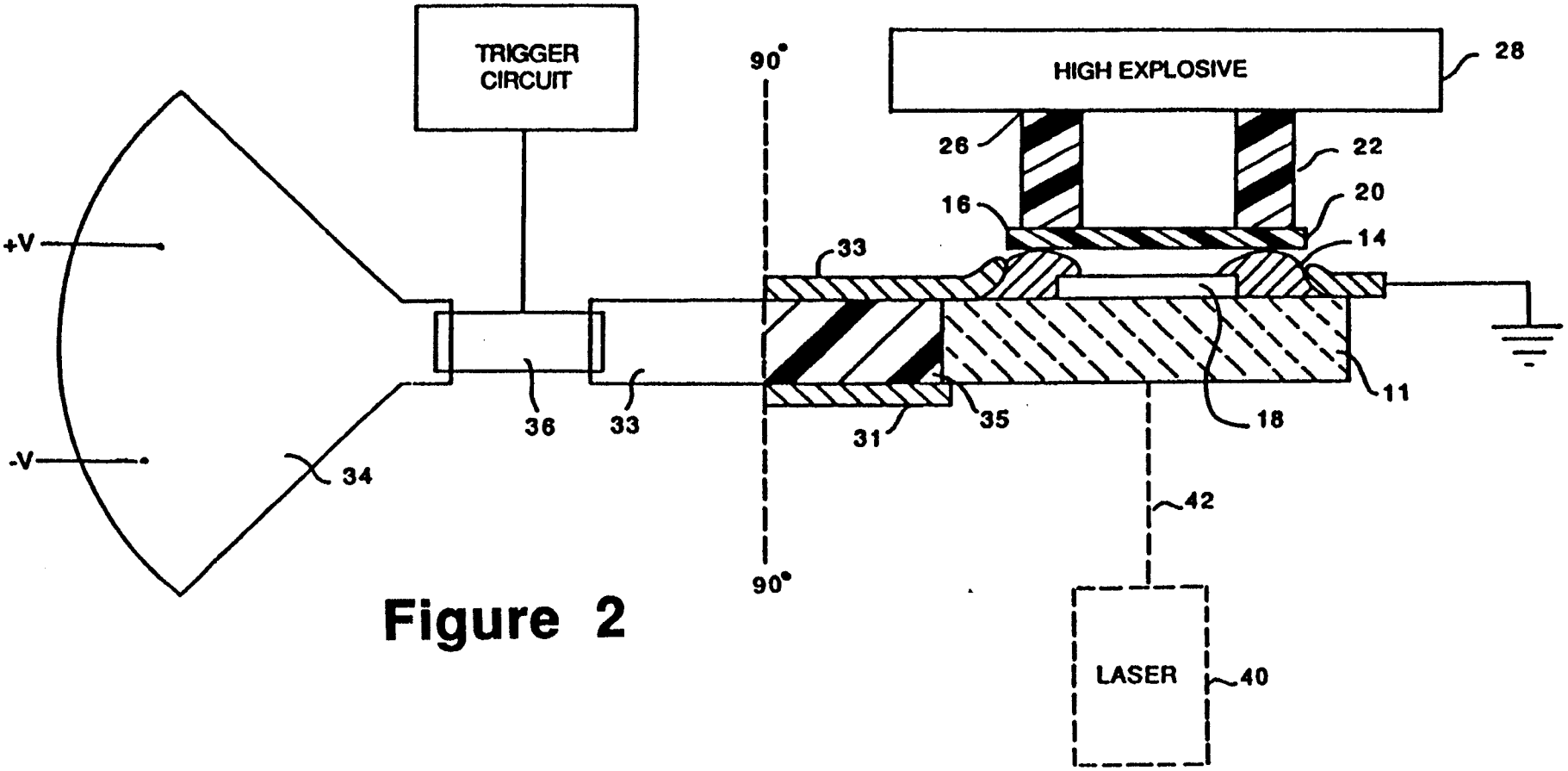
FIG. 2 shows a second version of the first embodiment of the invention.

FIG. 2 shows a preferred embodiment of the invention of FIG. 1. A top view of the input circuit is shown to the left of the dashed line in FIG. 2 marked "90°", while a cut-away side view is shown for the flyer assembly 10 of FIG. 1 to the right of the dashed line. A low inductance 0.02 uF capacitor 34 is preferably formed from approximately a 2 foot arc of a 1 foot radius circle of stripline material including top and bottom thin metallic films 33 and 31 separated by an insulating Kapton layer 35 having a thickness on the order of 1–3 mils. A dc voltage, V+, perferably on the order of 1–3 kV, is applied to one surface of capacitor 34; the return voltage, V−, is applied to the opposite surface. The stripline forming the one surface of capacitor 34 extends as short a distance as possible, to minimize inductance, to the input terminal of a low inductance, high voltage, fast, electronic switch 36. A suitable switch is disclosed in U.S. Pat. No. 3,663,855. The trigger circuit of switch 36 is connected to a trigger circuit as is well known in the art. The output of switch 36 is connected by a short stripline section 33 to the metallic land 16 of the SCB as described above. SCB bridge layer 18 generally abuts Kapton layer 35, although the thicknesses of the two layers may not be identical. SCB substrate 11 covers the side of layer 18 opposite lands 16 and 14.

For an SCB as disclosed in U.S. Pat. No. 4,708,060, layer 18 may be either doped silicon or polysilicon, and substrate 11 is either sapphire or silicon. However, an alternative version of the invention is also shown in FIG. 2 to include laser 40 which focuses laser beam 42 through a sapphire substrate 11 to an undoped silicon bridge 18'. For this version, layer 18' is undoped silicon with a high impedance that normally acts as an open switch in the circuit. Substrate 11 is sapphire or other material transparent to laser beam 42. Irradiation of undoped silicon 18' by laser 42 of sufficient energy and appropriate wavelength creates electrical carriers in the silicon via the photoconductive effect, thereby reducing the impedance of silicon 18' to approximately one ohm. Application of the input signal during this laser application causes ignition in a manner similar to the doped SCB.

Figure 3:
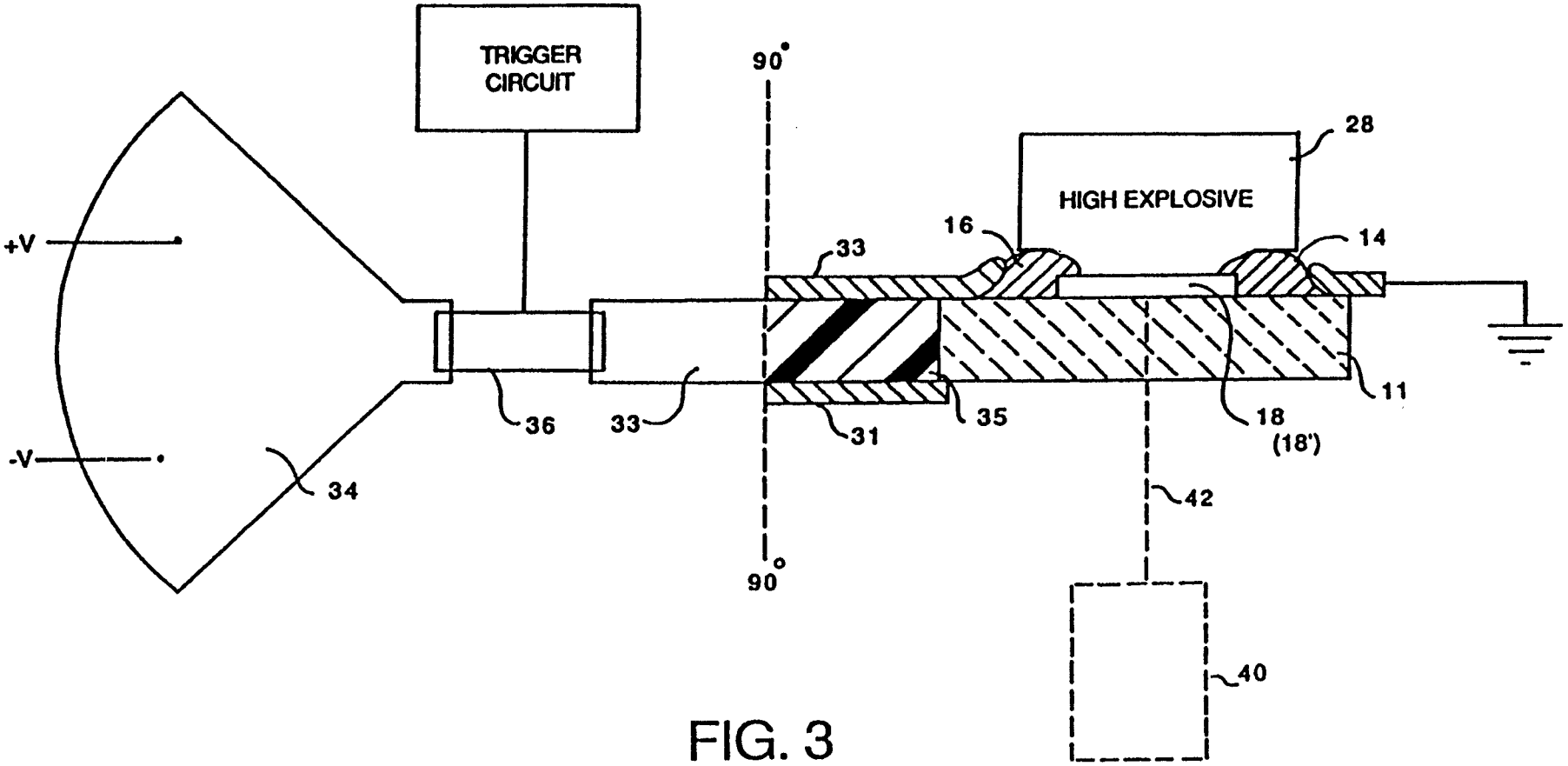
FIG. 3 shows a second embodiment of the invention.

FIG. 3 shows a second embodiment of the invention where the energy of the SCB directly ignites a high explosive 28 upon the application of a current pulse similar to that described in the first embodiment. In this figure, everything to the left of the vertical line marked 90° is understood to be similar to the structure of FIGS. 1 and 2. The SCB bridge may be doped silicon 18 on an insulating substrate 35; it may also be undoped silicon 18' on sapphire 11 with irradiation by laser 40 discussed above. Metal land 16 is connected to the input circuit, metal land 14 is connected to ground. High explosive 28 is in direct contact with the bridge 18 or 18'. When sufficient energy is applied from input circuit 30, the SCB ignites with sufficient energy to initiate the explosion.

The particular sizes and equipment discussed above are cited merely to illustrate a particular embodiment of this invention. It is contemplated that the use of the invention may involve components having different sizes and shapes as long as the principle, using a low inductance input circuit to fire a SCB to detonate high explosives, is followed. It is intended that the scope of the invention be defined by the claims appended hereto.

We claim:

1. A detonator for high explosives initiated by mechanical impact, said detonator comprising:

a layer of flyer material;

a substrate;

a semiconductor bridge ignitor on said substrate including a pair of electrically conductive pads connected by a semiconductor bridge, said bridge being in operational contact with said layer, whereby ignition of said bridge forces a portion of said layer through said barrel to detonate the explosive; and input means for igniting said semiconductor bridge ignitor.

2. The detonator of claim 1 wherein said input means comprises:

capacitor means for storing electrical energy;

switch means for switching electrical energy, said switch means having an input port connected to said capacitor, an output port connected to said semiconductor bridge ignitor, and a trigger port for receiving a trigger signal for closing said switch to fire said ignitor.

3. The detonator of claim 1 wherein said semiconductor bridge is highly doped.

4. The detonator of claim 1 further comprising a cylindrical barrel having a tubular opening extending from an output end, mechanically coupled to the explosive, to an input end adjacent said flyer material.

5. The detonator of claim 1 wherein said semiconductor bridge is undoped silicon and said substrate is sapphire, and further comprising:

laser means for directing a laser beam onto said bridge through said substrate to reduce the impedance of said bridge prior to ignition of said input means.

6. A detonator for high explosives comprising:

a semiconductor bridge ignitor including an pair of electrically conductive pads connected by a semiconductor bridge, said bridge being in direct contact with said explosive; and input means for providing sufficient electrical energy to said bridge to ignite said ignitor and detonate the explosive.

7. The detonator of claim 6 wherein said semiconductor bridge is not doped, said detonator further comprising laser means for directing a laser beam onto said bridge to lower the impedance of said bridge.

* * * * *